United States Patent [19]

Nishii et al.

[11] Patent Number: 5,013,094

[45] Date of Patent: May 7, 1991

[54] HYDRAULIC BRAKING SYSTEM

[75] Inventors: Michiharu Nishii, Toyota; Genji Mizuno, Toyoake; Hideo Mizukoshi, Hazu; Satoshi Ishida, Chiryu; Kyousuke Hata, Kariya, all of Japan

[73] Assignee: Aisin Seiki Kabushiki Kaisha, Kariya, Japan

[21] Appl. No.: 398,527

[22] Filed: Aug. 25, 1989

[30] Foreign Application Priority Data

Aug. 25, 1988 [JP] Japan .................. 63-210932

[51] Int. Cl.$^5$ .............................. B60T 8/32
[52] U.S. Cl. ...................... 303/52; 60/547.1; 188/358; 303/113; 303/116; 303/117; 303/119; 303/114
[58] Field of Search ................. 303/50–56, 303/13–14, 100, 114, 116, 119, 110, 61–63, 84.1, 113, 117; 60/547.1, 552, 553, 555, 556, 565, 566, 581, 545, 591, 563; 188/358, 359, 181 A, 181 R, 345

[56] References Cited

U.S. PATENT DOCUMENTS

| | | | |
|---|---|---|---|
| 4,728,155 | 3/1988 | Resch | 303/114 |
| 4,729,611 | 3/1988 | Kircher et al. | 188/358 X |
| 4,730,877 | 3/1988 | Seibert et al. | 188/358 X |
| 4,753,490 | 6/1988 | Belart et al. | 303/114 |
| 4,778,226 | 10/1988 | Brown | 303/14 X |
| 4,838,620 | 6/1989 | Sypniewski | 303/116 |
| 4,874,207 | 10/1989 | Nishii et al. | 188/358 X |

FOREIGN PATENT DOCUMENTS

| | | |
|---|---|---|
| 59-227552 | 12/1984 | Japan . |
| 62-166150 | 7/1987 | Japan . |
| 0119459 | 5/1989 | Japan .................. 303/119 |

Primary Examiner—Douglas C. Butler
Attorney, Agent, or Firm—Burns, Doane, Swecker & Mathis

[57] ABSTRACT

A hydraulic braking system capable of reducing the brake pedal stroke is provided by adding to the basic hydraulic braking system. The adding system is able to selectively execute the reduction of brake pedal stroke and, at the same time, capable of selectively adding anti-lock function and anti-slip function by including the changeover valves or opening and closing valves to the system. An auxiliary hydraulic pressure generator having a power hydraulic pressure source and regulator is interposed in the hydraulic conduit of at least one circuit, and an outlet port of the regulator is communicated to the wheel cylinders for connecting to the hydraulic conduit of the circuit. Brake pedal stroke can be reduced by inclusion of other conduit arrangements for adding the auxiliary hydraulic pressure generator and, at the same time, the changeover valve, anti-lock control changeover valve, and normally closed valve are selectively releasably added or mounted to the system, so that a brake system having short brake pedal stroke and sporty feeling can be obtained by low cost system ensuring desired braking operation. Additionally, anti-slip control for preventing the slipping of driving wheels can be added.

6 Claims, 5 Drawing Sheets

HYDRAULIC BRAKING SYSTEM

BACKGROUND OF THE INVENTION

1. Field of the Invention

The present invention relates to a braking system for a vehicle, and particularly, to a hydraulic braking system for reducing the brake pedal stroke during the braking operation.

2. Description of the Related Art

In a conventional vehicle braking system, the hydraulic conduit between the hydraulic braking generator (for example, a master cylinder) and the wheel cylinder is made with multiple circuits so that when one circuit becomes inoperative, the braking force is produced by remaining circuits. In general, such conventional dual circuit systems also utilize tandem master cylinders.

In order to reduce the force required to operate the brake pedal during braking, such a hydraulic braking system may be provided with a servo unit, also referred to as a servo or a booster. The servo unit may be powered by the vacuum intake from the intake manifold, for a vacuum booster, or hydraulic pressure, for a hydraulic booster.

According to the use of a hydraulic booster, as shown in Japanese Patent laid open publication No. 59-227552, reduction of the brake pedal stroke may be attempted by applying the output pressure from the booster directly to the wheel cylinders through one circuit. However, the servo unit must be a hydraulic booster. Reduction of the brake pedal stroke can not be accomplished with a hydraulic brake pressure control unit utilizing a vacuum booster and tandem master cylinders. As described in the publication, when the output hydraulic pressure of the booster is applied directly to the wheel cylinder, it becomes necessary to adjust the output pressure of master cylinders of brake circuits in order to properly distribute the braking force of the vehicle. Therefore, since the booster function depends on the operation of the master cylinder, the design and manufacture of this type of braking system is extraordinarily difficult.

A method for preventing output pressure variations in the hydraulic booster during anti-lock control operation is disclosed in Japanese Patent laid open publication No. 62-166150. This publication discloses a regulator for controlling the output pressure of the hydraulic power source in response to the output pressure of the booster or master cylinder, while at the same time, providing a hydraulic changeover value between the changeover valve and the master cylinder. The output pressure of the regulator is applied to the wheel cylinder only during anti-lock control. During normal operation the regulator pressure is diverted from the wheel cylinder.

Although the conventional problem with regard to anti-lock control is solved by the above-mentioned prior art, the introduction of the output pressure of the regulator to the wheel cylinder prevents the reduction of the brake pedal stroke. However, in Japanese Patent laid open publication No. 62-166150, the hydraulic power source and the regulator are both attached to the conventional anti-lock device. This is because of the added function of preventing pressure variation of the master cylinder in anti-lock control operation.

In recent vehicle brake systems, it is required to provide for various needs while keeping basic braking function. In particular, the aforementioned reduction of stroke of the brake pedal is a priority for a class of vehicles which might require swift braking action. However, this is not necessarily required for other types vehicles. When the conventional braking system is designed and manufactured so as to meet all use requirements for each type of vehicle in which it may be used, the manufacturing cost is increased.

Although it has been attempted to make the parts or device for common use in all vehicles, for reducing stroke of the brake pedal as aforementioned prior art, there is no arrangement by which it is attached to an existing basic brake system. Further, even though there is a device for attaching the anti-lock control function, it is not an arrangement that controls the original function of the basic brake system including reduction of pedal stroke.

SUMMARY OF THE INVENTION

Therefore, it is an object of the present invention to provide a hydraulic braking system for reducing the stroke of the brake pedal which may be attached to the basic hydraulic braking system.

It is another object of the present invention to provide a hydraulic braking system capable of selectively executing the reduction of the stroke of the brake pedal by selectively actuating the attached system.

It is a further object of the present invention to provide a hydraulic braking system capable of selecting either the anti-lock function or anti-slip function by adding a changeover or control means for the attached system.

It is a further object of the present invention to provide an improved hydraulic braking system which includes a reservoir for storing the brake fluid, a master cylinder for providing hydraulic pressure to the brake fluid of the reservoir in response to movement of the brake pedal. A plurality of wheel cylinders are connected to and communicate through the hydraulic pressure conduit which is divided into a plurality of circuits to the master cylinder. An auxiliary hydraulic pressure generator provided a power hydraulic pressure source for producing the power hydraulic pressure by increasing the pressure of the brake fluid of the reservoir to a predetermined pressure. A regulator provided for pressure controlling of the power hydraulic pressure of the power hydraulic source in response to the output hydraulic pressure of the master cylinder and is connected to one hydraulic pressure conduit of at least one of the hydraulic circuits of the hydraulic pressure conduits. The outlet port of the regulator is in communication to the wheel cylinder which is in communication with the hydraulic pressure conduit of the circuit.

It is also preferred to provide a changeover valve for selectively switching the wheel cylinder for hydraulic communication to the hydraulic pressure conduit of one circuit of the hydraulic braking system to either a first position for communication with the regulator or a second position for communication with the master cylinder. The changeover valve is maintained at the first position upon normal braking.

An auxiliary hydraulic pressure generator may be connected to the hydraulic pressure conduit of at least one circuit of the plurality of hydraulic pressure conduits for communicating with the plurality of wheel cylinders and the master cylinder and also interposing an anti-lock control changeover valve to the hydraulic pressure conduit of another circuit of the plurality of circuits. At the same time, a control valve may be interconnected for actuation in response to the slipping of a wheel during the braking operation. The control valve is connected to each of the hydraulic pressure conduits for communication with the plurality of wheel cylinders from either the anti-lock control changeover valve or the auxiliary hydraulic pressure generator so as to switch to a first position for communicating the control valve to the master cylinder during normal braking operation, or to second position for communicating the control valve to the regulator during anti-lock operation. The anti-lock control changeover valve also communicates with the regulator valve. An outlet port of the power hydraulic pressure source connects with the auxiliary hydraulic pressure generator and communicate with the control valve for communication with the wheel cylinder.

An auxiliary hydraulic pressure generator may also be connected with the power hydraulic pressure source and the regulator. The changeover valve and the anti-lock control changeover valve can be connected to the basic system.

The power hydraulic pressure from the power hydraulic pressure source is regulated to the predetermined hydraulic pressure in the regulator in response to the output hydraulic pressure of the master cylinder. The output hydraulic pressure of the regulator is directly applied to the wheel cylinder associated with at least one circuit, and the stroke of brake pedal required for the operation of a conventional master cylinder is unnecessary with respect to this circuit. Accordingly, the stroke of brake pedal is reduced relative to the convention device.

When the changeover valve for switching the wheel cylinder of the one circuit to either of the regulator and master cylinder is in communication with the regulator, the system operates the same as the first position during normal braking. When the changeover valve is switched to the second position such as in the case if the output hydraulic pressure of the regulator is lost, communication between the regulator and the wheel cylinder of the one circuit is isolated and the master cylinder is able to communicate with the wheel cylinder and braking operation is provided by the master cylinder.

If the system is provided with an anti-lock control changeover valve and feeding and discharging valve, the control valve is in communication with the regulator during anti-lock control operation. The output hydraulic pressure of the regulator is controlled by the control valve and is applied to the wheel cylinder so that locking of the wheel during braking operation is prevented.

Further, the system can be provided with a normally closed valve included with the anti-lock control changeover valve. When slippage of the driving wheels occurs during takeoff, the normally closed valve opens and the power hydraulic pressure port and the control valve of the driving wheel brought into communication. Therefore, the power hydraulic pressure is controlled by the control valve and is applied to the wheel cylinder to prevent excessive rotation of the driving wheel.

DETAILED DESCRIPTION OF THE PREFERRED EMBODIMENTS

Figure 1:
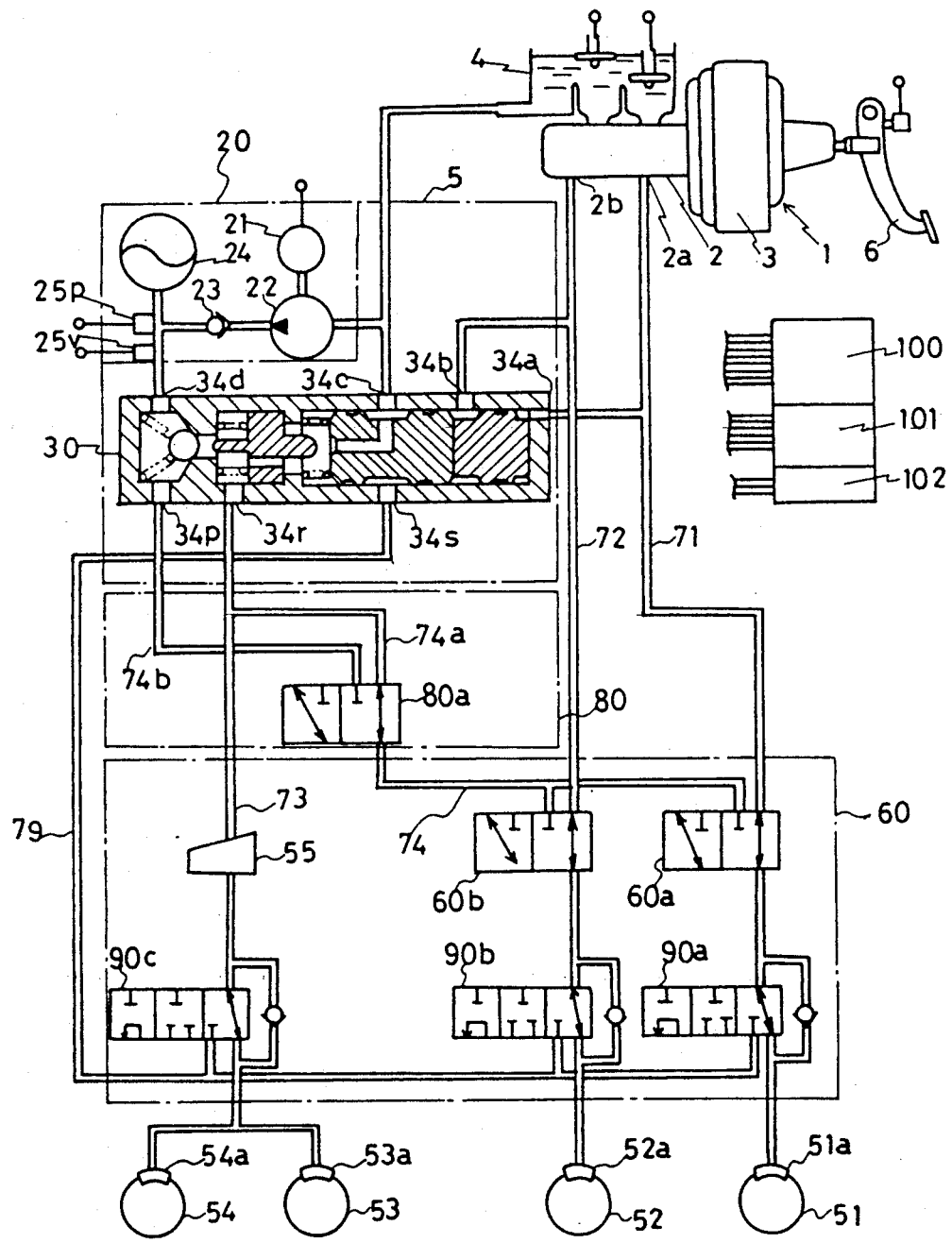
FIG. 1 is a diagram of a first embodiment of the hydraulic braking system of the present invention.

Hereinafter, embodiments of the present invention will be described in detail with reference to the accompanying drawings.

FIGS. 1 to 4 show embodiments of a hydraulic braking system of the present invention, in which an auxiliary hydraulic pressure generator structure 5, enclosed by a dot chain line, is connected to the hydraulic braking system which includes a hydraulic pressure generator 1 comprising a tandem master cylinder 2 and a vacuum booster 3. A reservoir 4 and the wheel cylinders 51a to 54a are connected to the hydraulic pressure generator 1. The auxiliary hydraulic pressure generator 5 comprises a source 20 for providing power hydraulic pressure and a regulator 30 which is attached to the basic hydraulic braking system so that various functions describing hereinafter can be added.

Various types of tandem master cylinders 2 are well known and any of them may be utilized for the present embodiments. For example, they may have a first pressure chamber and a second pressure chamber in which the two pressure chambers are contracted, respectively, by piston (not shown) moving in response to a first piston so as to increase the hydraulic pressure, which is transmitted from the outlet port 2a of the first pressure chamber and the outlet port 2b of the second pressure chamber. The vacuum booster 3 may also be of any known type and is not restricted to the vacuum type. A hydraulic booster, as shown in aforementioned prior art, may also be utilized.

Although the wheel cylinders 51a to 54a are divided into the wheel cylinders 51a, 52a for driving the brake system (not shown) of front wheels 51, 52, and the wheel cylinders 53a, 54a for driving the brake system (not shown) of rear wheels 53, 54, the hydraulic pressure conduit arrangements are different according to the respective embodiment.

The power hydraulic pressure source 20 is provided with hydraulic pressure pump 22 driven by the electric motor 21. An input side is connected to the reservoir 4 and an output side is connected to an accumulator 24 through a check valve 23 such that the power hydraulic pressure is transmitted by the accumulator 24. Further, this power hydraulic pressure is maintained to a predetermined pressure by being controlled intermittently with the electric motor 21 in response to the signal of a pressure sensor 25p by the control circuit 100. A pressure switch 25v is also provided to the outlet port. The output pressure of the power hydraulic pressure source 20 is detected and the detected signal is transmitted to the control circuit 100.

Figure 4:
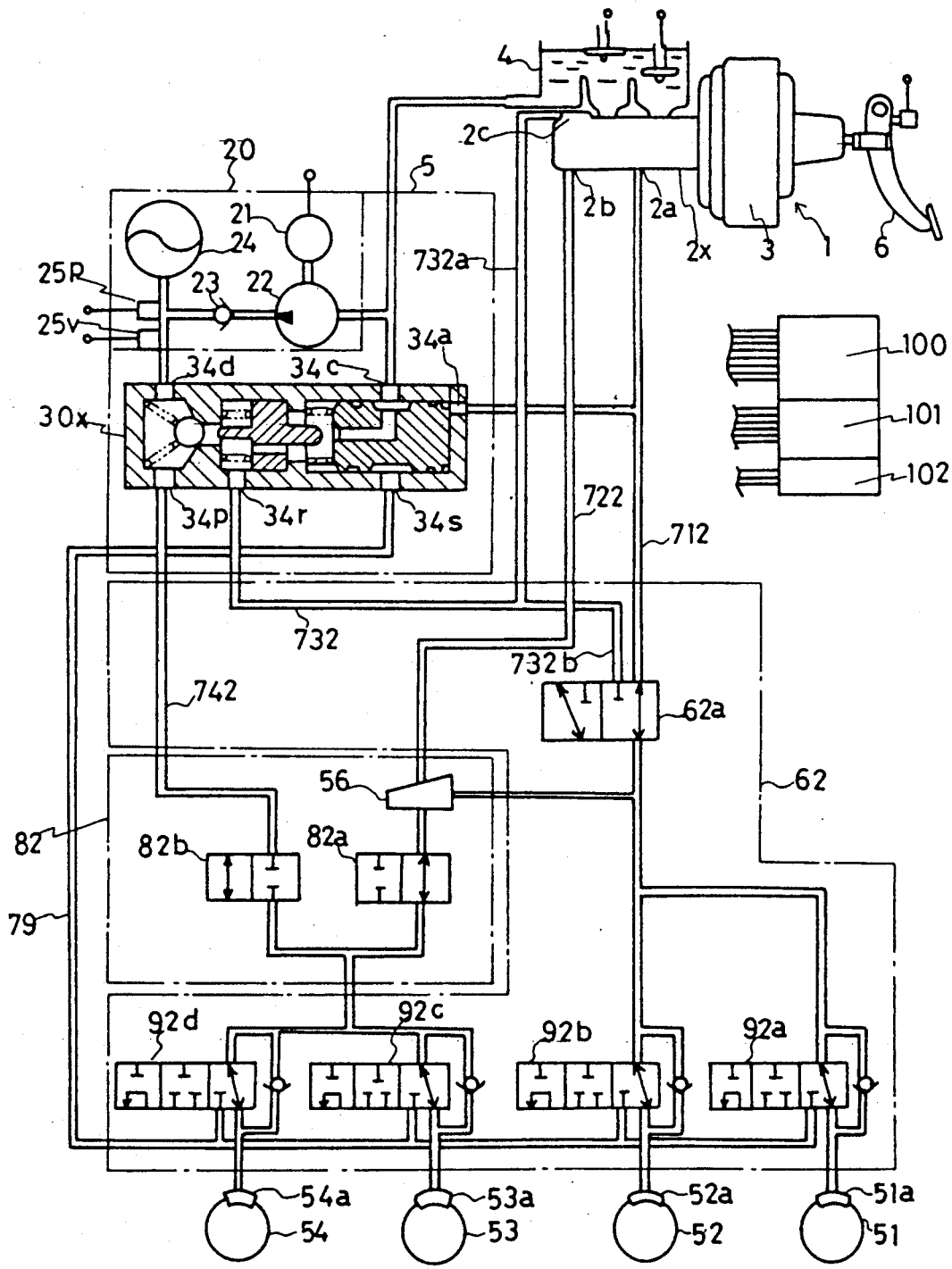
FIG. 4 is a diagram of a fourth embodiment of the hydraulic braking system of the present invention.
Figure 5:
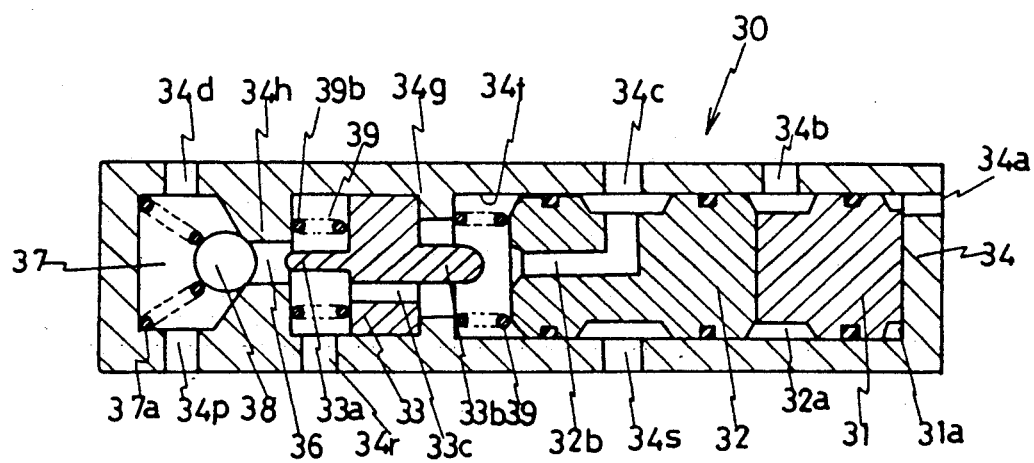
FIG. 5 is an enlarged cross-sectional view of the regulator valve shown in the embodiments of FIGS. 1 through 3.

The regulator 30, shown in FIG. 5, controls the power hydraulic pressure fed from the power hydraulic pressure source 20 to a pressure substantially equal to the pressure within the first and second pressure chamber of the tandem master cylinder 2. The regulator 30x of FIG. 4 is a somewhat different in construction from that of FIGS. 1-3. However, it will be treated the same as the other embodiments unless otherwise particularly specified in the explanation hereinafter.

In FIG. 5, a cylinder bore 34f is provided in a housing 34, and the ports 34a to 34d, 34p, 34r and 34s open into the cylinder bore 34f.

An annular shaped step portion 34g is formed in the interior of the cylinder bore 34f, a step shaped first piston 31 and a second piston 32 are slidably and liquid tightly positioned between the annular shaped step portion 34g and an interior end wall of the cylinder bore 34f. A compression spring 39a extends between the annular shaped step portion 34g and the second piston 32 so that the first and second pistons 31, 32 are pressed or urged in the direction of the interior wall surface of the end portion. Since these first and second pistons 31, 32 are step shaped, a first hydraulic pressure chamber 31a is formed between the first piston 31 and the end wall surface of cylinder bore 34f. A second hydraulic pressure chamber 32a is formed between the first and second pistons 31, 32, and inlet ports 34a, 34b are open to each chamber.

A passage 32b is provided in the second piston 32, one end of which is open to an annular groove formed circumferentially of the second piston 32. The annular groove communicates with the drain ports 34c and 34s connecting to the reservoir 4. The other end is open along the central portion of the piston 32 and extends in the direction of the annular step portion 34g.

A partition wall 34h is formed in the cylinder bore 34f and is provided with a passage 36. A power hydraulic pressure chamber 37 is formed between the partitioning wall 34h and the other interior end side wall surface. Inlet port 34d and the power hydraulic pressure outlet port 34p connect with the power hydraulic pressure chamber 37. A spherically shaped valve body 38 is disposed within the power hydraulic pressure chamber 37 and is urged by compression spring 37a in a direction to block the communication passage 36.

A valve body 33 is slidably positioned between the annular step portion 34g and the partition wall 34h and is urged by compression spring 39b in a direction toward the annular step portion 34g. Protrusions 33a, 33b, protruding in an axial direction at both sides are formed on valve body 33. The protrusion 33a is movable through the interior of the communicating pathway 36, in response to the sliding movement of the valve body 33, to lift the valve body 38 off its seat. The protrusion 33b is movable to close the opening of the passage 32b. The communication passage 33c is formed in the valve body 33. A pressure control chamber 39 is formed between the partition wall 34h and the second piston 32, and the outlet port 34r is in communication with the pressure control chamber 39.

In the event that any one pressure chamber of the tandem master cylinder 2 does not output the brake hydraulic pressure, the regulator 30 becomes regulated by the output brake hydraulic pressure of the other pressure chamber of the tandem master cylinder 2. For example, even if the output hydraulic pressure of the outlet port 2a is lost, the second piston 32 is moved slidably by the output hydraulic pressure of the outlet port 2b so as to operate the valve body 33. When the output hydraulic pressure of the outlet port 2b is lost, the first piston 31 is moved slidably by the output hydraulic pressure of the outlet port 2a, and operates the valve body 33 through the second piston 32. Thus, even if the output hydraulic pressure of one pressure chamber is lost, the output hydraulic pressure is transmitted from the regulator 30 in response to the output hydraulic pressure of the other pressure chamber.

The power hydraulic pressure is fed to the power hydraulic pressure chamber 37 from the inlet port 34d. When the output hydraulic pressure of tandem master cylinder 2 is fed to the inlet port 34a and/or inlet port 34b, at least the second piston 32 compresses the compression spring 39a, and abuts the valve body 33. The pathway 32b is blocked by the protrusion 33b and communication with the reservoir 4 is isolated. When the second piston 32 is further moved, the valve body 33 is pushed against the compression spring 39b and the protrusion 33a pushes the valve body 38 against the compression spring 37a. The communicating passage 36 is opened, and the power hydraulic pressure chamber 37 and the pressure control chamber 39 are in communication through the passage 33c.

When the power hydraulic pressure is introduced to the interior of the pressure control chamber 39 and exceeds the output hydraulic pressure of the tandem master cylinder 2 applied to the second piston 32, the second piston 32 is moved in the direction of first piston 31. The protrusion 33a of the valve body 33 is displaced from the valve body 38 and the valve body 38 blocks the communicating passage 36. The second piston 32 is displaced from the valve body 33, and the pressure control chamber 39 is communicated to the passage 32b and to the reservoir 4 through the drain port 34c so as to reduce the pressure. And, when the hydraulic pressure of the interior of pressure control chamber 39 is under the output hydraulic pressure of the tandem master cylinder 2, the second piston 32 is moved in the direction of the valve body 33 and increases the pressure in the interior of the pressure control chamber 39. These operations are repeated and the hydraulic pressure of the interior of the pressure control chamber 39 is regulated to a pressure substantially equal to the output hydraulic pressure of the tandem master cylinder 2 and is transmitted from the outlet port 34r. Further, the output power hydraulic pressure of the power hydraulic pressure source 20 is transmitted from the power hydraulic outlet port 34p.

FIG. 1 shows a first embodiment of the hydraulic braking system of the present invention used in a front wheel drive vehicle so that the front wheel 51, 52 are the driving wheels. The outlet port 2a of the tandem master cylinder 2 is connected to the wheel cylinder 51a of front wheel 51 by a hydraulic conduit 71, the port 2b is connected to the wheel cylinder 52a by a hydraulic conduit 72, and the outlet port 34r of the regulator 30 is connected to the wheel cylinders 53a, 54a of the rear wheels 53, 54 through the proportioning valve 55 by a hydraulic conduit 73.

An anti-lock control system 60 and an anti-slip control system 80 are connected to the hydraulic conduits 71 to 73. The anti-lock control system includes the anti-lock control changeover valves 60a, 60b and the control valves 90a, 90b connected, respectively, to the hydraulic conduits 71, 72, and check valves provided in parallel to the control valve 90c connected to the hydraulic conduit 73 and the control valves 90a and 90b. The anti-slip control system comprises an anti-slip control changeover valve 80a which is a normally closed valve in the present invention. The anti-lock control system 60 and anti-slip control system 80 are respectively controlled by anti-lock control circuit 101 and anti-slip control circuit 102 attached to the control circuit 100.

The anti-lock control changeover valve 60a, 60b are 3-port, 2-position electromagnetic valves, which communicate, respectively, with control valves 90a, 90b and with the outlet ports 2a, 2b when deactivated, and communicate through the anti-slip control changeover valve 80a to the outlet port 34r of the regulator 30 by the hydraulic conduits 74, 74a when activated.

The control valves 90a, 90b are 3-port, 3-position, electromagnetic valves, which communicate with the wheel cylinders 51a, 52a and the anti-lock control changeover valves 60a, 60b at a first position, prevent communication at a second position, and communicate with the reservoir 4 through the hydraulic conduit 79 and the drain ports 34s, 34c at a third position. Normal brake operation is executed at the first position during normal operation, and one of the first to third positions is selected appropriately by the anti-lock control circuit 101 and the brake hydraulic pressure is controlled.

The wheel cylinders 53a, 54a are connected together and connected to the control valve 90c and check valve mounted in parallel to valve 90c. The control valve 90c is of the same construction as the control valves 90a, 90b, and is connected to the regulator 30 through the proportioning valve 55.

Therefore, when the wheel speed and the car speed are detected by sensors (not shown) and transmitted to the control circuit 101, the slipping condition of the wheel from moment to moment is discriminated by a microcomputer (not shown), activation or deactivation of the solenoid coil of the control valves 90a to 90c is controlled in response to the sensed conditions, and the brake hydraulic pressures of the wheel cylinders 51a to 54a are controlled so as to prevent lock-up of the wheels.

The anti-slip control changeover valve 80a is 3-port, 2-position electromagnetic valve, connected to the hydraulic conduit 74a for communicating with the outlet port 34r of the regulator 30 and with the hydraulic conduit 74 for connecting with the anti-lock control changeover valves 60a, 60b, and being connected to the power hydraulic pressure outlet port 34p through the hydraulic conduit 74b. During usual brake operation and anti-lock brake control, communication is provided between the hydraulic conduits 74, 74a. During anti-slip control communication is interrupted between the hydraulic conduits 74, 74a, and communication is established between the hydraulic conduits 74, 74b.

In operation, the changeover valves 60a, 60b and 80a and the control valves 90a to 90c are positioned as shown in the drawing during normal brake operating. Accordingly, the front wheels 51, 52 are braked due to the output brake hydraulic pressure of the tandem master cylinder 2, and the rear wheels 53, 54 are braked due to the output hydraulic pressure of the regulator 30, and the stroke of the bake pedal 6 is reduced relative to the braking by the output brake hydraulic pressure of the tandem master cylinder 2.

When the slipping condition of the car wheels is detected and anti-lock control is initiated by the anti-lock control circuit 101, the anti-lock control changeover valves 60a, 60b are operated by anti-lock control circuit 101 and the hydraulic conduits 71 and 72 are interrupted, and the output hydraulic pressure of the regulator 30 is transmitted from the outlet port 34r to the control valves 90a, 90b. The three 3 positions of the control valves 90a to 90c are selected appropriately in response to the lock condition of the front and rear wheels 51 to 54 by the anti-lock control circuit 101, and hydraulic pressure to the wheel cylinders 51a to 54a is optimly controlled.

At this moment, since the output brake hydraulic pressure of the tandem master cylinder 2 is applied from the outlet port 2b to the second hydraulic pressure chamber 32a and to the first hydraulic pressure chamber 31a, the interior of the pressure control chamber 39 is regulated to the hydraulic pressure substantially equal to these hydraulic pressures. Accordingly, the brake hydraulic pressure is substantially equal to the output hydraulic pressure of the tandem master cylinder 2 and is applied to the control valves 90a to 90c for the anti-lock control.

The anti-lock control is continued to the front wheels 51, 52 and the rear wheels 53, 54 as long as the regulator 30 is supplying hydraulic fluid, even if one of outputs of hydraulic pressure of the tandem master cylinder 2 is lost during the brake operation, the anti-lock control is continued.

When the anti-lock control is terminated, the anti-lock control changeover valves 60a, 60b are returned to the normal state, communicating the hydraulic conduits 71, 72, and the anti-lock control changeover valves 60a, 60b assume the state shown in the drawing. When the brake pedal 6 is released and the first and second pistons of the tandem master cylinder 2 are returned and the first and second pressure chambers are expanded, the check valves mounted in parallel with the control valves 90a to 90c lift off their seats and the wheel cylinder pressures are rapidly reduced.

When slipping of a driving wheel occurs, i.e., front wheels 51, 52 in this embodiment are started or accelerated, the anti-slip control changeover valve 80a is operated by the anti-slip control circuit 102, the power hydraulic pressure is fed to the control valves 90a, 90b from the power hydraulic pressure source 20 through the hydraulic conduits 74b, 74 and the anti-lock control changeover valves 60a, 60b. The control valves 90a, 90b are controlled regardless of the operation of the brake pedal, and the braking power is applied to the front wheels 51, 52 so as to prevent wheel slippage and stable driving power can be ensured. Since the power hydraulic pressure from the power hydraulic pressure source 20 is in a cut off state when the anti-slip control changeover valve 80a is operated and when the anti-lock control changeover valves 60a, 60b are operated, the wheel cylinders 51a, 52a are communicated with the outlet port 34r of the regulator 30, and the power hydraulic pressure source 20 is not communicated with the tandem master cylinder 2. Even if any one of the changeover valves have not been operated, the power hydraulic pressure is not fed to the tandem master cylinder, and smooth switching operation can be ensured.

Further, in case the auxiliary hydraulic pressure generator 5 is unable to operate due to, for example, the stoppage of the power hydraulic pressure source 20, etc., and since the anti-lock control changeover valves 60a, 60b are inoperable, the front wheels 51, 52 can be braked by operation of the tandem master cylinder 2. If a vacuum booster 3 is mounted to the hydraulic braking pressure generator 1, the servo function would not be lost as in the case of employing a hydraulic booster and the servo pressure is ensured.

Thus, according to this embodiment, the stroke of the brake pedal 6 can be reduced by only adding the auxiliary hydraulic pressure generator 5 to the hydraulic braking system equipped with normal tandem master cylinder and providing a connection to the reservoir 4.

In case that either the anti-lock control function is added or the anti-slip control function is added to the hydraulic braking pressure generator 1, it is preferred either to provide the anti-lock control changeover valves 60a, 60b and the control valves 90a, 90b, 90c, or to provide the anti-slip control changeover valve 80a. These can be added appropriately in response to varying vehicle usage.

Figure 2:
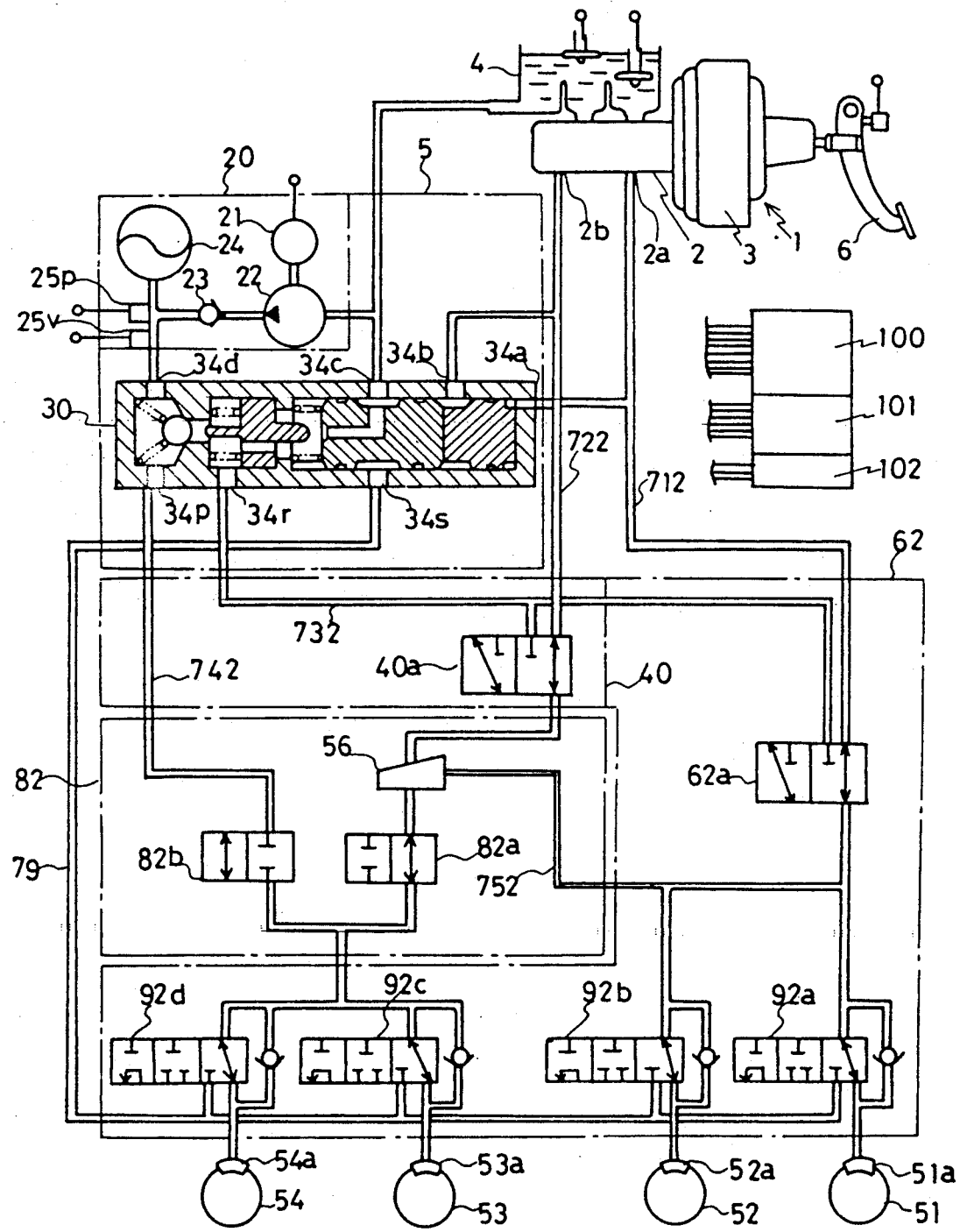
FIG. 2 is a diagram of a second embodiment of the hydraulic braking system of the present invention.

FIG. 2 shows the hydraulic braking system according to the second embodiment of the present invention, in which the like reference numbarals or symbols designate like parts or portions of FIG. 2. This embodiment is of the rear wheel drive type and the hydraulic system is divided into a front and rear system. The control valves 92a to 92d are respectively connected to the wheel cylinders 51a to 54a.

While the first embodiment is constructed so as to reduce the stroke always in response to the operation of the brake pedal 6 in case of normal brake operation, in this embodiment, the power changeover device 40 includes the changeover valve 40a, so that it is able to switch between providing stroke reduction of the brake pedal 6 and not providing stroke reduction. That is to say, the changeover valve 40a is interposed between the outlet port 2b of the tandem master cylinder and the conduit 722 for connecting the wheel cylinders 53a, 54a of the rear wheels 53, 54, and the changeover valve 40a is connected to the outlet port 34r of the regulator 30 by way of the conduit 732.

The changeover valve 40a is a 3-port, 2-position electromagnetic valve, with which the wheel cylinders 53a, 54a communicate with tandem master cylinder 2 and the hydraulic conduit 732 is interrupted during non-operation and the output hydraulic pressure of the regulator 30 is directly applied to the wheel cylinders 53a, 54a during operation. The changeover valve 40a is operated in response to the operation of ignition switch (not shown) for the engine starting. That is to say, it is operated when the ignition switch is turned to the starting side, and the wheel cylinders 53a, 54a are communicated to the outlet port 34r through the control valves 92c, 92d and the normally opened valve 82a. When either the hydraulic pressure level of the reservoir 4 drops or the output hydraulic pressure of the power hydraulic pressure source 20 drops so as to be detected by the control circuit 100, the changeover valve 40a is rendered non-operational.

The proportioning and by-pass valve 56 is connected to the hydraulic conduit 722 and to the hydraulic conduit 712 through the by-pass hydraulic conduit 752. The anti-lock control system 62 and anti-slip control system 82 are hereinafter described in the state shown in FIG. 2.

The anti-lock control system 62 includes the power changeover device 40, interposed between the outlet port 2a of the tandem master cylinder 2 and the hydraulic conduit 712, the control valves 92a to 92d connected to each of the wheel cylinders 51a to 54a and the anti-lock control changeover valve 62a connected to the hydraulic conduit 732, and being controlled by the anti-lock control circuit 101.

The anti-lock control changeover valve 62a is a 3-port, 2-position electromagnetic valve, which is in a non-operating condition in FIG. 2, i.e., non-operational, when it is controlled by the anti-lock control circuit 101, to switch to an operating condition.

The anti-slip control system 82 includes the aforementioned normally opened valve 82a, and the normally closed valve 82b interposed in the hydraulic conduit 742 for connecting the power hydraulic pressure outlet port 34p of the regulator 30 and the wheel cylinders 53a, 54a, and executes the anti-slip control in cooperation with the control valves 92c, 92d. The normally opened valve 82a and the normally closed valve 82b are electromagnetic valves controlled by the anti-slip control circuit 102 when the slipping condition of the rear wheels 53, 54, which are the driving wheels, is detected. Firstly, the normally opened valve 82a is operated to interrupt the hydraulic conduit 722. Next, the normally closed valve 82b is operated to communicate the hydraulic conduit 742. Accordingly, the output power hydraulic pressure of the power hydraulic pressure source 20 is fed to the control valves 92c, 92d.

In the second embodiment, FIG. 2 shows the position of the valves when the engine is stopped and the wheel cylinders 51a to 54a are connected to the tandem cylinder 2. When the ignition switch is turned to the engine start side, the changeover valve 40a is operated and the rear wheels 53, 54 are provided with braking operation by the output hydraulic pressure of the regulator 30 and the stroke of the brake pedal 6 is reduced. In the anti-lock control operation, the anti-lock control changeover valve 62a also is switched and the output hydraulic pressure of the regulator 30 is fed to the control valves 92a to 92d, and optimum hydraulic pressure control is transmitted so as to prevent wheel lock. The output power hydraulic pressure of the power hydraulic pressure source 20 is fed to the control valves 92c, 92d through the normally closed valve 82b during anti-slip control, and excessive rotation of the rear wheels 53, 54 is prevented.

Thus, in this embodiment, the stroke of the brake pedal 6 can be reduced as in the first embodiment by only adding the auxiliary hydraulic pressure generator 5 and the changeover valve 40a to the basic brake hydraulic braking pressure generator 1 and changing the reservoir 4 so as to be suitable for connection to the auxiliary hydraulic pressure generator 5.

Particularly, in the second embodiment, since the changeover valve 40a is provided and in an operational state for reducing stroke of the brake pedal 6, when the hydraulic pressure of the reservoir 4 is lowered due to the auxiliary hydraulic pressure generator 5 or the output hydraulic pressure of the power hydraulic pressure source 20 is lowered, the rear wheels 53, 54 are switched to the brake operation by the tandem master cylinder 2 by making the hydraulic valve 40a non-operational. The pedal stroke remains the same as before, but a predetermined braking force can be ensured. The servo function accorded by the vacuum booster 3 is maintained.

Since the changeover valve 40a returns to its normal state, i.e., non-operating state when turning the ignition switch OFF, as aforementioned, the wheel cylinders 51a to 54a are connected with the tandem master cylinder 2, and the braking force is ensured by the tandem master cylinder 2 even if the ignition switch is OFF during running of the vehicle. Further, it is possible to construct the changeover valve 40a so as to be non-operational in case that the reduction of the stroke of the brake pedal 6 is not necessary. And, as in the first embodiment, it is possible to add the anti-lock control function and the anti-slip control function to the hydraulic braking pressure generator 1, as desired.

Figure 3:
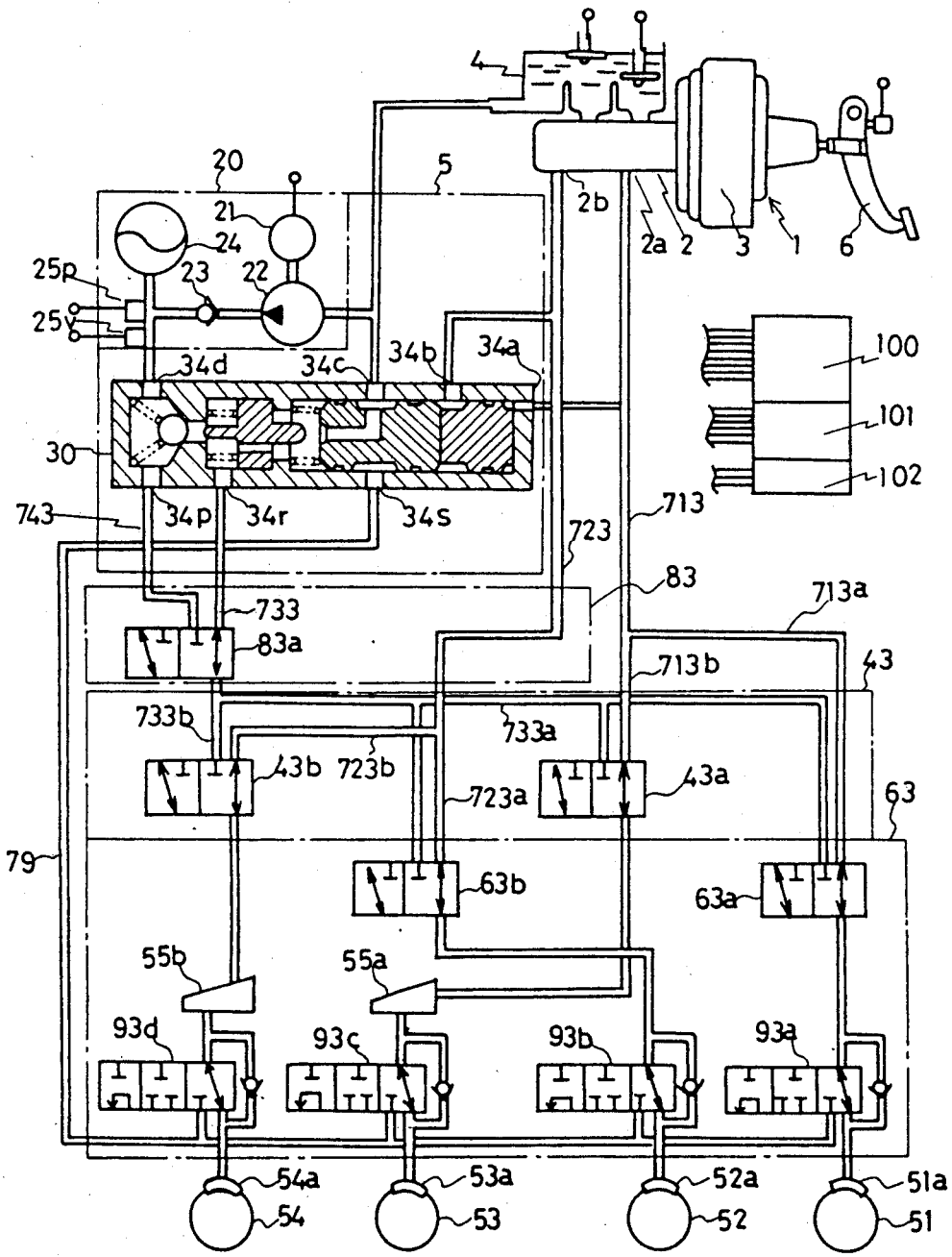
FIG. 3 is a diagram of a third embodiment of the hydraulic braking system of the present invention.

FIG. 3 is a hydraulic braking system showing a third embodiment of the present invention, in which like reference numerals or symbols are designated to like parts or portions of FIG. 1. In this embodiment, the front wheels 51, 52 are front wheel driving wheels, and the hydraulic pressure circuit is of the diagonal dividing type, i.e., each of the hydraulic conduits 713, 723 are diverged in their connection to the front and rear wheels. In this embodiment, as in the second embodiment, the power changeover device 43 is provided, and it is possible to reduce the stroke of the brake pedal 6 when the engine is in an operating state.

The changeover valves 43a, 43b are interposed respectively in the hydraulic conduits 713b, 723b for connecting respectively the outlet ports 2a, 2b of the tandem master cylinder 2 and the wheel cylinders 53a, 54a of the rear wheels 53, 54. The wheel cylinders 53a, 54a are connected to the outlet port 34r of the regulator valve 30 through the anti-slip control changeover valve 83a through the hydraulic conduit 733.

The changeover valves 43a, 43b are 3-port, 2-position electromagnetic valves, electrically connected to the ignition system, and are shown in FIG. 3 when the ignition switch is OFF, the wheel cylinders 53a, 54a are in communication with the outlet ports 2a, 2b of the tandem master cylinder 2 through the proportioning valves 55a, 55b and the hereinafter describing control valves 93c, 93d. When the ignition switch is turned on, the changeover valves 43a, 43b are operational, the wheel cylinders 53a, 54a communicate with the outlet port 34r of the regulator 30 through the anti-slip control changeover valve 83a, and the output hydraulic pressure of the regulator is directly applied.

The anti-lock control system 63 is included with the power changeover device 83, and includes the anti-lock control changeover valves 63a, 63b interposed in hydraulic conduits 713a, 723a, respectively, for connecting with respective outlet ports 2a, 2b of the tandem master cylinder 2. The wheel cylinders 51a, 52a of the front wheels 51, 52, being connected to the hydraulic conduit 733a through the valves 63a, 63b and the control valves 93a to 93d connected, respectively, to each wheel cylinders 51a to 54a, and being controlled by the anti-lock control circuit 101. The anti-lock control changeover valves 63a, 63b are 3-port, 2-position electromagnetic valves, the same as the changeover valves 43a, 43b. The output hydraulic pressure of the regulator 30 is applied to the control valves 93a to 93d through the anti-slip control changeover valve 83a of FIG. 3, and the control valves 93a to 93d are controlled as in the first embodiment.

The anti-slip control system 83 includes the anti-slip control changeover valve 83a, and the anti-slip control is executed by the cooperation of the changeover valves 43a, 43b, the anti-lock control changeover valves 63a, 63b and the control valves 93a, 93b as directed by the anti-slip control circuit 102. The anti-slip control changeover valve 83a is a 3-port, 2-position electromagnetic valve as other changeover valves, which operates so as to communicate between the hydraulic conduit 733 and the hydraulic conduits 733a, 733b and to communicate the changeover valves 43a, 43b and the anti-lock control changeover valve 63a, 63b with the outlet port 34r of the regulator 30 when non-operational and to cut off communication with the power hydraulic pressure outlet port 34p by the hydraulic conduit 743 when operational. The anti-slip control changeover valve 83a is normally closed in relation with the communication control between the hydraulic conduit 743 and the hydraulic conduits 733a, 733b, so as to interrupt communication with the power hydraulic pressure outlet port 34p.

When the slipping state of the front driving wheels 51, 52 is detected, the changeover valves 43a, 43b connected to the wheel cylinders 53a, 54a of the rear wheels 53, 54 are rendered non-operational. Next, the anti-lock control changeover valves 63a, 63b are operated, and the control valves 93a, 93b are connected to the anti-slip control changeover valve 83a through the hydraulic conduit 733. Thereafter, the anti-slip control changeover valve 83a is switched to the hydraulic conduit 743. Accordingly, the output power hydraulic pressure of the power hydraulic pressure source 20 is fed to the control valves 93a, 93b. As in the first and second embodiments, the control valves 93a, 93b are controlled and the anti-slip control of the front wheels 51, 52 is obtained.

In third embodiment, the changeover valve and the like are in the state shown in FIG. 3 during normal brake operation, the wheel cylinders 51a to 54a are all connected to the tandem master cylinder 2. When the ignition switch is turned on, since the changeover valves 43a, 43b are operated and rear wheels 53, 54 are subjected to braking operation by the output hydraulic pressure of the regulator 30, the stroke of the brake pedal 6 is reduced.

During anti-lock control, the anti-lock control changeover valves 63a, 63b are actuated and the output hydraulic pressure of the regulator 30 is transmitted to the control valves 93a and 93b with optimum hydraulic pressure control so as to prevent locking of the vehicle brakes. The output power hydraulic pressure of the power hydraulic pressure source 20 is fed to the control valves 93a, 93b through the anti-slip control changeover valve 83a and the anti-lock control changeover valves 63a, 63b during anti-slip control and excessive rotation of the front drive wheels 51, 52 is prevented.

In third embodiment, since the changeover valves 43a, 43b are provided, similar to the changeover valve 40a of second embodiment, when either the ignition switch is turned OFF, or the power hydraulic pressure is decreased or lost, it is possible to switch to all wheel braking by the tandem master cylinder 2.

FIG. 4 shows the hydraulic braking system in relation with a fourth embodiment of the present invention, in which like reference numberals or symbols are designated like parts or portions of FIG. 1. This embodiments is related to rear wheel driving as in the second embodiment, the hydraulic system is of the front and rear divided type, and the control valves 94a to 94d are respectively connected to the wheel cylinders 52a to 54a.

In this embodiment, the regulator 30x is different from the regulator 30 in the description of FIG. 5 in that the first piston 31 is eliminated. Therefore, first hydraulic pressure chamber 31a and the inlet port 34b also are eliminated, other than that the construction is substantially same as regulator 30. Further, each port in FIG. 4 is designated with the numerals or symbols corresponding to respective ports of FIG. 5.

The tandem master cylinder 2x has an inlet port 2c opening to the supply chamber (not shown) and communicating to second pressure chamber (not shown) relative to the tandem master cylinder 2 of first to third embodiments. The outlet port 34r of the regulator 30x is connected to this inlet port 2c through the hydraulic conduit 732, 732a. Further, a tandem master cylinder having an inlet of this type is known as described in, for example, Japanese patent laid open publication No. 62-155167.

The output hydraulic pressure of the regulator 30x is applied to the wheel cylinders 53a, 54a through the hydraulic conduits 732, 732a, the inlet port 2c, the supply chamber and second pressure chamber (not shown), the outlet port 2b, hydraulic conduit 722, proportioning and by-pass valve 56, normally opened valve 82a and the control valves 92c, 92d. The braking action is accomplished as in the previous embodiments with a reduced stroke of the brake pedal 6.

During anti-lock control, the anti-lock control valve 62a is switched and the output hydraulic pressure of the regulator 30x is fed to the valves 92a to 92d, so as to prevent lock-up with the vehicle wheels. During anti-slip control, the normally closed valve 82b is operated after the normally opened valve 82a is operated, the output power hydraulic pressure of the power hydraulic pressure source 20 is fed to the control valves 92c, 92d, and excessive rotation of the rear drive wheels 53, 54 is prevented.

If power hydraulic pressure is lost, the anti-lock control valve 62a, the normally opened valve 82a and the normally closed valve 82b are rendered non-operational, so that the front wheels 51, 52 and the rear wheels 53, 54 are switched to the braking operation of the tandem master cylinder 2x, and a predetermined braking power is ensured.

In the embodiment, it is required to change the reservoir 4 in order to provide the input port 2c to the tandem master cylinder 2. The change with regard to the basic hydraulic braking pressure generator 1 is minimized. However, in this fourth embodiment, as it will be clear in FIG. 4, the changeover valve 40a of second embodiment is not necessary, and it can be constructed at low cost as the form of the tandem master cylinder 2x decreases the number of electromagnetic valves.

The hydraulic braking system of the present invention positions the auxiliary hydraulic pressure generator to the hydraulic conduit of at least one system. It can be easily added to the normal brake hydraulic braking pressure generator, for example, to the hydraulic braking system equipped with the tandem master cylinder. The brake pedal stroke can be reduced by adding the auxiliary hydraulic pressure generator system to the hydraulic braking system basic component and providing the appropriate conduits for connection with the common parts in the same kind of vehicle and, therefore, low production costs can be obtained. When the changeover valve is added to the system and the wheel cylinder is switched and communicated with the regulator and the master cylinder, the brake pedal stroke is reduced by the regulator during normal brake operation. The brake operation can be executed by the master cylinder when stroke reduction is not required or if the regulator is non-operational, so that predetermined braking operation can be ensured.

The anti-lock control changeover valve and the anti-lock control function can be added to the system with the aforementioned auxiliary hydraulic pressure generator. This makes it possible to equip the system appropriately as desired, and it is possible to easily meet diverse specifications and needs. The simple construction of adding the normally closed valve to the above-mentioned system, makes it possible to add anti-slip control for preventing slipping of the driving wheels.

Further, the changeover valve and the anti-lock control changeover valve are rendered to releasably connect with the auxiliary hydraulic pressure generator of the unitary body brake system. The unitary arrangement is disposed to the brake system assembly line of the vehicle so that it is easy to connect with the basic hydraulic braking system. Furthermore, either the changeover valve or the anti-lock changeover valve is equipped appropriately, so that the aforementioned assembly can be selectively added and the difficulty of complying with diverse specifications can be decreased.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic braking system comprising:
a reservoir for brake fluid,
a master cylinder having at least a pair of pressure chambers for pressurizing and transmitting the brake fluid of said reservoir as a brake hydraulic pressure in response to actuation of a brake pedal,
a plurality of wheel cylinders connected and communicating with said master cylinder through a plurality of hydraulic circuits,
an auxiliary hydraulic pressure generator provided with a power hydraulic pressure source for increasing the brake fluid of said reservoir to a determined pressure and transmitting the power hydraulic pressure, said auxiliary hydraulic pressure generator being connected to at least one hydraulic circuit of said plurality of hydraulic circuits, and
regulator means comprising: a housing having at least four ports which individually are connected to at least one of said pressure chambers of the master cylinder, said reservoir, said power hydraulic pressure source, and at least one of said wheel cylinders; piston means for providing a pressure chamber connected to at lest a first one of the pressure chambers of the master cylinder and a pressure control chamber connected to at least one of said wheel cylinders; and valve means for controlling communication between said power hydraulic pressure source and said reservoir, wherein said regulator means controls the output power hydraulic pressure of said power hydraulic pressure source in response to the output brake hydraulic pressure of said master cylinder.

2. A hydraulic braking system according to claim 1, wherein said auxiliary hydraulic pressure generator is connected to said at least one hydraulic circuit of said plurality of circuits for communicating with said master cylinder and said plurality of wheel cylinders, an anti-lock control changeover valve connected to a hydraulic conduit of another hydraulic circuit, and a control valve connected to each said hydraulic circuit for communicating to said plurality of wheel cylinders from one of said anti-lock control changeover valve and said auxiliary hydraulic pressure generator, said anti-lock control changeover valve being connected to said regulator means, and said control valve being controlled by switching to one of a first position for communicating said control valve to said master cylinder during normal braking and a second position for communicating said control valve to said regulator means during anti-lock control.

3. A hydraulic braking system according to claim 2, wherein said auxiliary hydraulic pressure generator has an outlet port for transmitting the output power hydraulic pressure of said power hydraulic pressure source, and said auxiliary hydraulic pressure generator outlet port being communicated through a normally closed valve to the control valve for communicating with a wheel cylinder mounted to a driving wheel.

4. A hydraulic braking system according to claim 1, wherein said housing includes a fifth port connected to a second one of said at least pair of pressure chambers in the master cylinder; the pressure chamber provided by said piston means defining a first pressure chamber connected to said first pressure chamber in the master cylinder; said piston means providing a second pressure chamber connected to said second pressure chamber in said master cylinder, said piston means including a first piston, a second piston and a valve; said vale means including a valve body and a spring for biasing the valve body.

5. A hydraulic braking system according to claim 4, wherein said auxiliary hydraulic pressure generator is connected to said at least one hydraulic circuit of said plurality of circuits for communicating with said master cylinder and said plurality of wheel cylinders, an anti-lock control changeover valve connected to a hydraulic conduit of another hydraulic circuit, and a control valve connected to each said hydraulic circuit for communicating to said plurality of wheel cylinders from one of said anti-lock control changeover valve and said auxiliary hydraulic pressure generator, said anti-lock control changeover valve being connected to said regulator means, and said control valve being controlled by switching to one of a first position for communicating said control valve to said master cylinder during normal braking and a second position for communicating said control valve to said regulator means during anti-lock control.

6. A hydraulic braking system according to claim 1, wherein said valve means and said piston means are separate from one another.

* * * * *